United States Patent
Dorrance et al.

(10) Patent No.: US 10,697,766 B1
(45) Date of Patent: *Jun. 30, 2020

(54) METHOD AND APPARATUS FOR COMPENSATING VEHICLE INSPECTION SYSTEM MEASUREMENTS FOR EFFECTS OF VEHICLE MOTION

(71) Applicant: Hunter Engineering Company, St. Louis, MO (US)

(72) Inventors: Daniel R. Dorrance, Ballwin, MO (US); Bruce E. Bernard, St. Charles, MO (US); Aaron C. Hall, St. Louis, MO (US); Nicholas J. Colarelli, III, Frontenac, MO (US); Timothy A. Strege, Sunset Hills, MO (US)

(73) Assignee: Hunter Engineering Company, St. Louis, MO (US)

( * ) Notice: Subject to any disclaimer, the term of this patent is extended or adjusted under 35 U.S.C. 154(b) by 347 days.

This patent is subject to a terminal disclaimer.

(21) Appl. No.: 15/646,329

(22) Filed: Jul. 11, 2017

Related U.S. Application Data

(63) Continuation-in-part of application No. 14/947,940, filed on Nov. 20, 2015, now Pat. No. 9,779,561.

(Continued)

(51) Int. Cl.
*G01B 11/275* (2006.01)
*G01M 17/04* (2006.01)
(Continued)

(52) U.S. Cl.
CPC .......... *G01B 11/2755* (2013.01); *G01L 17/00* (2013.01); *G01M 17/04* (2013.01); *G01M 17/06* (2013.01)

(58) Field of Classification Search
None
See application file for complete search history.

(56) References Cited

U.S. PATENT DOCUMENTS 4,123,023 A 10/1978 Nelson
4,143,970 A * 3/1979 Lill ...................... G01B 11/275
356/139.09

(Continued)

FOREIGN PATENT DOCUMENTS

JP 63094103 4/1988
JP 11120480 4/1999

(Continued)

OTHER PUBLICATIONS

Sensing Solutions—Automotive Industry, pp. 1-12, 2005, Keyence Corporation, Product Lit. No. SS05S-AUTO-KA-L-E 0085-1, Japan.

(Continued)

*Primary Examiner* — Tung S Lau
(74) *Attorney, Agent, or Firm* — Sandberg Phoenix & von Gontard, P.C.

(57) ABSTRACT

A vehicle inspection system configured with a processing system and at least one displacement sensor disposed on opposite sides of a vehicle inspection lane sensor region to acquire displacement measurement data associated with a moving vehicle passing through the vehicle inspection lane. The processing system is configured to receive acquired displacement measurement data to determine characteristics of the moving vehicle, such as vehicle velocity, dynamic axle alignment, dynamic wheel alignment, or dimensions. The processing system is further configured to evaluate the determined dynamic vehicle characteristics in relation to static vehicle characteristics, such as static axle alignment or static wheel alignment, through application of one or more (Continued)

compensation factors based on user selected parameters, default parameters, or identified vehicle features.

17 Claims, 4 Drawing Sheets

Related U.S. Application Data

(60) Provisional application No. 62/084,396, filed on Nov. 25, 2014, provisional application No. 62/198,860, filed on Jul. 30, 2015.

(51) Int. Cl.
*G01M 17/06* (2006.01)
*G01L 17/00* (2006.01)

(56) References Cited

U.S. PATENT DOCUMENTS

| | | | |
|---|---|---|---|
| 4,153,131 A | | 5/1979 | Sakata et al. |
| 4,249,824 A | * | 2/1981 | Wiederrich ........ G01B 11/2755 356/153 |
| 4,341,021 A | | 7/1982 | Beissbarth |
| 4,745,469 A | | 5/1988 | Waldecker et al. |
| 4,863,266 A | | 9/1989 | Masuko et al. |
| 4,899,218 A | | 2/1990 | Waldecker et al. |
| 5,220,399 A | | 6/1993 | Christian et al. |
| 5,268,731 A | | 12/1993 | Fuchiwaki et al. |
| 5,281,901 A | * | 1/1994 | Yardley ................ G05D 1/0265 318/587 |
| 5,532,816 A | | 7/1996 | Spann et al. |
| 5,600,435 A | | 2/1997 | Bartko et al. |
| 5,650,703 A | * | 7/1997 | Yardley ................ G05D 1/0265 180/167 |
| 5,731,870 A | | 3/1998 | Bartko et al. |
| 5,793,492 A | | 8/1998 | Vanaki |
| 5,812,256 A | | 9/1998 | Chapin et al. |
| 5,818,574 A | | 10/1998 | Jones et al. |
| 5,978,077 A | | 11/1999 | Koerner et al. |
| 6,151,562 A | | 11/2000 | Merrill |
| 6,412,183 B1 | | 7/2002 | Uno |
| 6,545,750 B2 | | 4/2003 | Roth et al. |
| 6,559,936 B1 | | 5/2003 | Colombo et al. |
| 6,657,711 B1 | | 12/2003 | Kitagawa et al. |
| 6,748,796 B1 | | 6/2004 | Van Den Bossche |
| 6,894,771 B1 | | 5/2005 | Dorrance et al. |
| 7,177,740 B1 | | 2/2007 | Guangjun et al. |
| 7,336,350 B2 | | 2/2008 | Dorrance et al. |
| 7,454,841 B2 | | 11/2008 | Burns, Jr. et al. |
| 7,774,946 B2 | | 8/2010 | Boni et al. |
| 7,864,309 B2 | | 1/2011 | De Sloovere et al. |
| 8,107,062 B2 | | 1/2012 | De Sloovere et al. |
| 9,377,379 B2 | | 6/2016 | Lee |
| 9,677,974 B2 | | 6/2017 | Lee |
| 9,779,561 B1 | * | 10/2017 | Dorrance ............. G07C 5/0808 |
| 2003/0094039 A1 | | 5/2003 | Poulbot |
| 2003/0142294 A1 | | 7/2003 | Jackson et al. |
| 2006/0090356 A1 | | 5/2006 | Stieff |
| 2006/0152711 A1 | | 7/2006 | Dale, Jr. et al. |
| 2007/0044537 A1 | | 3/2007 | Knox |
| 2007/0124949 A1 | | 6/2007 | Burns, Jr. et al. |
| 2010/0180676 A1 | | 7/2010 | Braghiroli et al. |
| 2013/0158777 A1 | | 6/2013 | Brauer et al. |
| 2014/0129076 A1 | | 5/2014 | Mouchet et al. |
| 2014/0253908 A1 | * | 9/2014 | Lee ................... G01B 11/2755 356/139.09 |
| 2014/0310967 A1 | | 10/2014 | Nagornov |
| 2015/0043786 A1 | * | 2/2015 | Ohki ................. H04N 5/23254 382/107 |
| 2015/0059458 A1 | | 3/2015 | Lee |
| 2015/0219785 A1 | | 8/2015 | Tudor et al. |

FOREIGN PATENT DOCUMENTS

| | | |
|---|---|---|
| JP | 5371299 B2 | 12/2013 |
| WO | 2014134719 A1 | 9/2014 |
| WO | 2014151666 A1 | 9/2014 |

OTHER PUBLICATIONS

CCD Laser Displacement Sensor General Catalog LK-G Series, pp. 1-22, 2006, Keyence Corporation, Product Lit. No. LKG-KA-C3-E 0076-1, Japan.

CCD Laser Displacement Sensor General Catalog LK-G Series, pp. 1-22, 2006, Keyence Corporation, Product Lit. No. LKG-WW-C3-E 0096-1, Japan.

K. De Sloovere, W. Pastorius, Ph.D, Wheel Alignment Goes 3-D, pp. 1-5, Nov. 5, 2010, Quality Digest Magazine, www.qualitydigest.com.

X-3Dprofile—Dürr Reinvents Wheel Geometry Measurement, pp. 1-2, 2007, Dürr Assembly Products, www.durr.com.

OPTIMA Laser Distance Sensor, pp. 1-2, Mar. 2004, BS2 Multidata GmbH, www.bs-multidata.com.

SIDIS 3D-CAM Wheel Alignment Benches With Innovative Measuring System, pp. 1-8, 2010, Siemens AG, Germany.

Banalogic, Fastlign—The Gold Standard in Vehicle Alignment and Tracking Verification, Banalogic Corp. product literature, pp. 1-4, Oct. 2013, Raleigh, USA.

Expert Solutions—Automotive Industry, pp. 1-4, 2009, Keyence Corporation, Product Lit. No. MeasureExpertAuto-KA-EN0630-E 1034-4, Japan.

\* cited by examiner

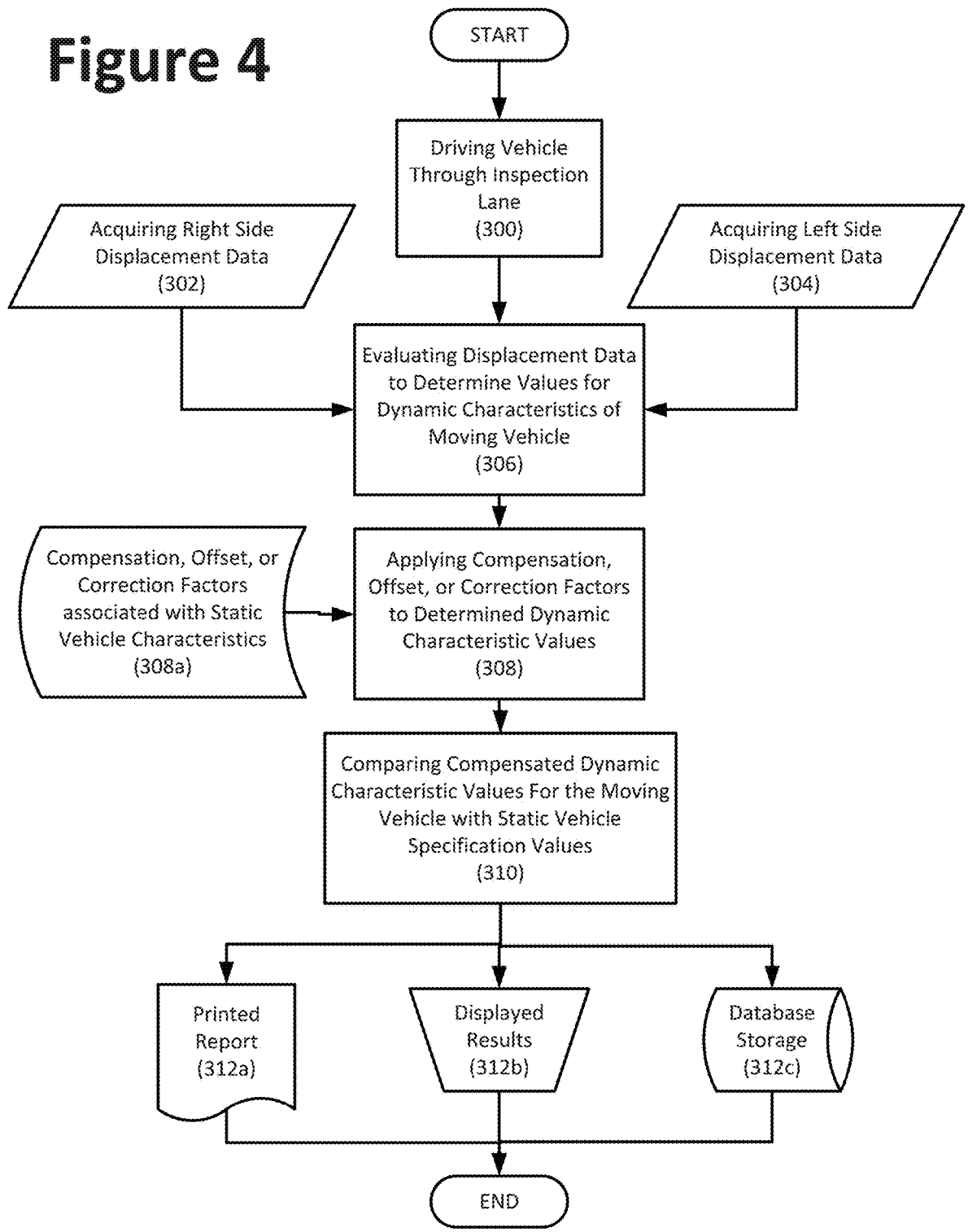

METHOD AND APPARATUS FOR COMPENSATING VEHICLE INSPECTION SYSTEM MEASUREMENTS FOR EFFECTS OF VEHICLE MOTION

CROSS-REFERENCE TO RELATED APPLICATIONS

The present application is a continuation-in-part of co-pending U.S. patent application Ser. No. 14/947,940 filed on Nov. 20, 2015, which in turn is related to, and claims priority from, U.S. Provisional Patent Application Ser. No. 62/084,396 filed on Nov. 25, 2014, and from U.S. Provisional Patent Application Ser. No. 62/198,860 filed on Jul. 30, 2015. Each of the aforementioned applications are herein incorporated by reference.

STATEMENT REGARDING FEDERALLY SPONSORED RESEARCH

Not Applicable.

BACKGROUND OF THE INVENTION

The present application is related to vehicle measurement or inspection systems configured to acquire measurement data associated with components of a vehicle as the vehicle moves through a vehicle inspection lane, and in particular, to a vehicle measurement or inspection system in which measurement data acquired from a moving vehicle is compensated for at least one variable associated with the motion of the vehicle, to facilitating comparison with measurement data or specification values associated with the vehicle in a stationary condition.

Systems for measuring or inspecting vehicle properties, such as wheel alignment and associated parameters, are traditionally set up for obtaining measurements to a high degree of accuracy under controlled conditions, such as with a vehicle disposed on a level surface or alignment lift rack in a stationary and driverless configuration. These vehicle measurement or inspection systems may require the temporary placement of various inclinometers or optical targets on the vehicle wheels, from which data is acquired to determine the various measurements.

Vehicle wheel alignment systems have utilized a variety of techniques for non-contact measurement of stationary vehicle wheel assembly parameters, from which vehicle wheel alignment angles can be determined. For example, by utilizing multiple displacement measurement sensors, displacement measurements between known sensor locations and multiple locations on a stationary vehicle wheel assembly can be measured. Processing the acquired measurements from sensors observing wheels on opposite sides of an axle can identify planes parallel to the wheel assembly surfaces, from which representations of axle total toe and wheel camber angles for the vehicle can be determined. In other configurations, two-dimensional images of a stationary vehicle wheel assembly are acquired, and image processing algorithms utilized to identify geometric features such as the wheel rim edge, from which a perspective analysis can be performed to determine estimates of vehicle wheel assembly spatial position and orientation. Alternatively, structured light patterns, such as multiple laser lines, or colored stripes, can be projected onto the stationary wheel assembly surface and observed by an imaging system. Deviations in the projected pattern are analyzed to generate representations of the illuminated surfaces, from which vehicle wheel assembly spatial position and orientation can be estimated. In general, these systems require the vehicle to remain stationary relative to the sensors during the measurement acquisition procedure, but some non-contact measurement systems require either the wheel assembly or the sensors be rotated in place about a stationary axis of rotation during the measurement acquisition procedure.

Some non-contact measurement systems can acquire measurements as a vehicle wheel assembly is both rotated and translated past the sensors, i.e., as the vehicle is moving or driven between a set of sensors. For example, using laser displacement sensors to measure a distance between a fixed sensor and various points on vehicle wheel assemblies on opposite sides of a vehicle as a vehicle is driven between the sensors, enables a vehicle inspection system to acquire measurement data along horizontal slices of the wheel assemblies, from which approximations of the wheel and axle spatial orientations can be derived. These types of systems are highly influenced by the speed at which the vehicle travels between the sensors, the angle (straightness) of vehicle traveling relative to the sensor observation axis, suspension movement, the presence and weight of the driver, and changes in a steering direction of the vehicle as it passes between the sensors. Measurements acquired from a moving vehicle are useful to provide a vehicle service quick check or audit inspection, capable of identifying vehicles which may be in need of a further, more precise, alignment inspection and/or adjustment.

Accordingly, there would be a benefit to the vehicle service quick check or inspection industry if additional vehicle measurements are acquired as the vehicle is driven, such as by a customer, through a measurement region of a vehicle inspection lane without stopping, and if variations in vehicle speed, steering, suspension movement, driver presence, or direction of travel are identified and/or accounted for during the acquisition of measurements associated with the moving vehicle, enabling resulting measurements of the vehicle in motion to provide meaningful information relative to specifications or measurements associated with a stationary vehicle.

BRIEF SUMMARY OF THE INVENTION

Briefly stated, the present application sets forth a vehicle measurement or inspection system which utilizes one or more displacement sensors disposed in sensor units on opposite sides of a sensor region in a vehicle inspection lane to acquire displacement measurement data associated with a moving vehicle passing through the sensor region. A processing system is configured to receive and evaluate the displacement measurement data, together with the known parameters of the measurement system and at least one moving vehicle correction factor to determine moving vehicle parameters (dynamic alignment measurements) which can be compared to stationary vehicle specifications (static alignment specifications).

In a further embodiment of the vehicle measurement or inspection system of the present application, the processing system configured with moving vehicle correction factors based on one or more parameters such as vehicle type (i.e., small car, sports car, luxury car, truck, SUV), specific vehicle model/year, tire size, tire type, wheel size, tire pressure, vehicle ride height, driver weight and driver side position. The moving vehicle correction factors may be stored in an accessible database, retrieved from a remote system in response to an identification of the vehicle undergoing measurement, or selected by an operator.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 4 is a flow chart illustrating an exemplary method of the present disclosure.

Figure 1:
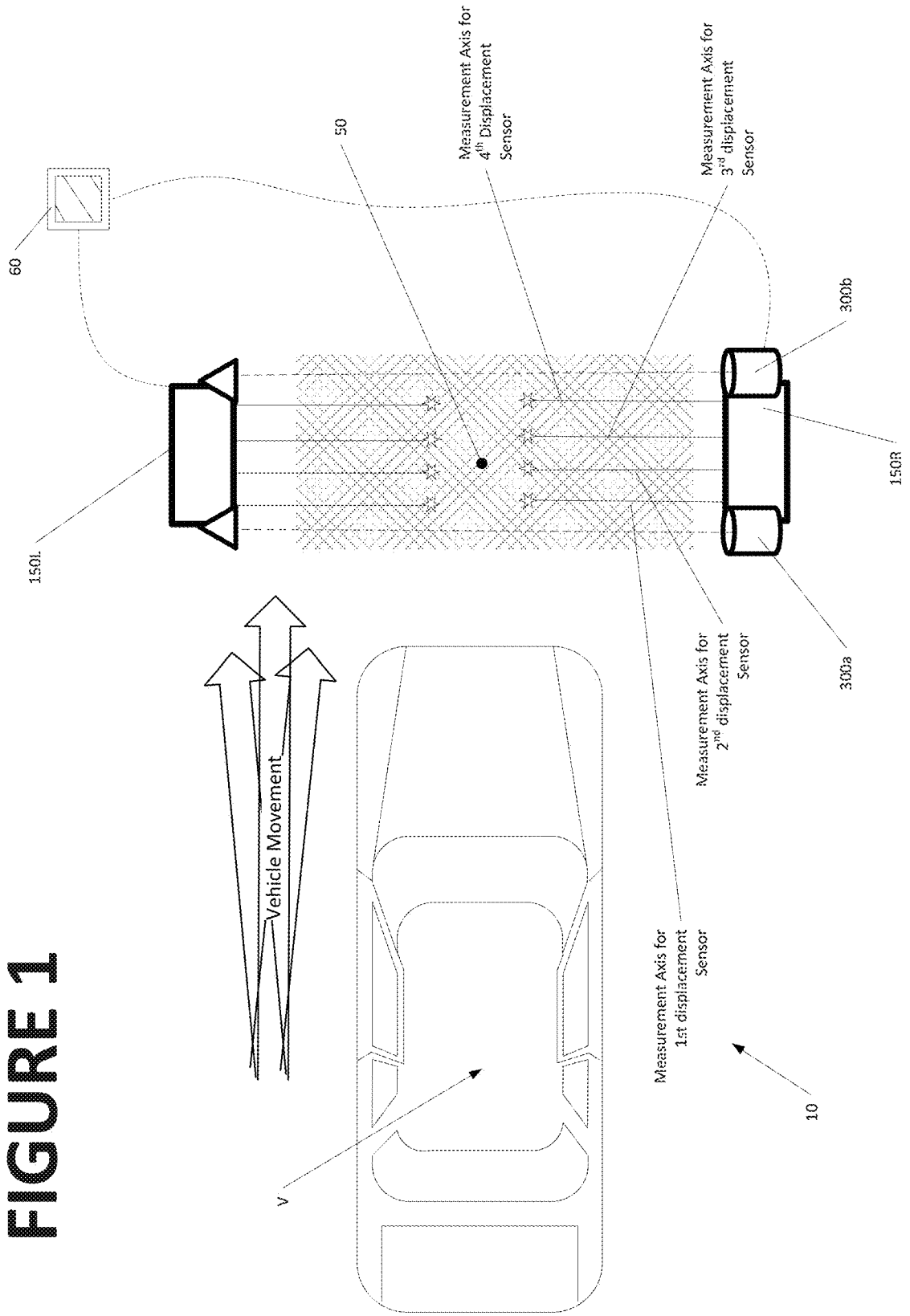
FIG. 1 is a top plan view of a vehicle inspection lane, illustrating an exemplary configuration and placement location for sensor units of the present disclosure in a drive-through configuration.

Corresponding reference numerals indicate corresponding parts throughout the several figures of the drawings. It is to be understood that the drawings are for illustrating the concepts set forth in the present disclosure and are not to scale. Before any embodiments of the invention are explained in detail, it is to be understood that the invention is not limited in its application to the details of construction and the arrangement of components set forth in the following description or illustrated in the accompanying drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

The term "axle", as used herein, is intended to refer to a pair of vehicle wheel assemblies, each consisting of a wheel rim and a tire, disposed on opposite lateral sides of the vehicle, and which are generally axially aligned with respect to each other, such as the left and right front wheels or the left and right rear wheels. The pair of vehicle wheel assemblies may be, but is not limited to wheel assemblies coupled by a solid interconnecting axle shaft, by a pair of half-shafts coupled through a differential, those which are partially independent of each other, or those which are fully independent of each other.

Since the present application describes features which exist on opposite lateral sides of a vehicle inspection lane, but which are otherwise identical, it will be understood that the use of the reference designations Left and Right, or L and R as in the Figures, identify corresponding components utilized at locations relative to the left and right lateral sides of a vehicle or vehicle inspection lane. For example, a sensor unit described generically as 150 will be designated as 150R and 150L when specifically shown or described at either the right or left side of the vehicle inspection lane 10.

A vehicle measurement system of the present disclosure is generally intended for use in a vehicle service shop drive-through configuration, where a moving vehicle V is driven through a sensing region 50 within the vehicle service or inspection lane 10, as seen in FIG. 1, in a generally straight line (but not necessarily along, or parallel to, a longitudinal midline of the vehicle service or inspection lane 10), while being observed by various sensors acquiring measurement data, and optionally, acquiring vehicle-associated still-frame or motion video images.

The array of sensors provides an operator with an initial diagnostic overview of the moving vehicle V with minimal operator interaction, and may include displacement sensors for acquiring data related to vehicle wheel alignment, drive-over tire tread depth sensors for measuring tire tread wear conditions, and tire pressure measurement sensors for measuring tire inflation conditions. Machine vision systems may be included for recording vehicle body panels for damage or misalignment, for observing tire sidewall markings to identify tire parameters such as size to type, and/or for capturing vehicle identifying information such as license plate data. Depending upon the configuration of the various sensors observing the vehicle V as it moves through the sensing region 50, an operator may be provided, at an operator console 60, with a detailed report on the condition of multiple components of the vehicle V, such as alignment conditions, tire wear conditions, tire type, tire pressure measurements, recalled vehicle and customer records, and recommended services and/or replacement parts such as suitably sized replacement tires, without the need to manually identify, record, or retrieve any data.

In one embodiment, the present disclosure sets forth a system for capturing data associated with a moving vehicle V, and such as the individual wheel assemblies 104 on each axle. Within the system, one or more sensor assemblies or units 150, each containing at least one displacement sensor 200, are disposed on each lateral side of the sensing region 50 to observe the opposite sides of the vehicle V moving through the sensing region 50. To facilitate placement within an inspection lane 10, each sensor unit 150 may be contained within a vertical tower positioned on a floor surface in proximity to the drive-through sensing region 50, within a wall-mounted housing, within a surface or flush-mount configuration, or within a combination thereof suitable for mounting one or more displacement sensors 200 and their associated components to observe the sensing region 50.

Each displacement sensor 200 is associated with an operational range within which the displacement sensor 200 is capable of measuring, to within a desired tolerance, a distance to an observed surface. Given the wide variation in configurations of vehicles V, each displacement sensor 200 is preferably disposed such that the observed surfaces on an intended collection of vehicle configurations will pass through the associated operational ranges. Data from the displacement sensors 200 is conveyed to a processing system (local or remote) configured with suitable software instructions to control and/or communicate with the various displacement sensors, receive data therefrom, analyze the received data, receive operator input, and convey resulting measurements to one or more outputs. The operator input and output is preferably conveyed through a suitably configured operator console 60.

Each sensor unit 150 consists of a support framework configured as necessary to mount at least one displacement sensor 200, or preferably, two or more laterally spaced displacement sensors 200, such that an operative field of view for each displacement sensor 200 encompasses observable lateral side surfaces associated with a range of measurable vehicles V traversing the sensing region 50 of the inspection lane 10. Displacement sensors 200 are preferably laser displacement sensors, as will be described below, but those of ordinary skill in the art will recognize that other types of displacement sensors, including 2D imaging, time-of-flight optical sensors, and ultrasonic sensors capable of obtaining displacement measurements to surfaces within a field of view may be utilized. Provisions may be included within each sensor unit 150 for additional other types of sensors associated with a vehicle inspection system.

Within a sensor unit 150 containing multiple displacement sensors 200, a lateral spacing between the displacement sensors 200, as well as an associated vertical position of each, may be either random or determined, as each displacement sensor 200 functions as an independent measurement sensor to contribute measurement data to a collection of displacement measurements associated with a vehicle V passing through the inspection lane 10. Displacement measurement data acquired from multiple points or locations on a passing vehicle V, such as from individual wheel assemblies 104, as the vehicle moves through the sensing region 50 of the inspection lane 10 is utilized by the suitably configured processing system to establish average displacement measurements associated with select features on the vehicle, to discard outlier displacement measurements using tolerance ranges or other statistical analysis techniques, or to determine one or more dynamic vehicle characteristics.

These dynamic vehicle characteristics are characteristics of the vehicle while in motion, may include wheel alignment angles (corresponding to individual wheel toe, axle total toe, or individual wheel camber), vehicle axle conditions, vehicle alignment axes (thrust line, body centerline, etc.), vehicle dimensions (ride height), wheel runout, changes in vehicle velocity (braking or accelerating), oscillations in the vehicle suspension (such as from driving over a raised lip or recessed drain in the inspection lane floor surface), biases associated with the vehicle motion, and steering changes as the vehicle V passes through the vehicle inspection lane 10. The processing system may be further configured to evaluate dynamic vehicle characteristics determined from multiple measurements acquired by a single displacement sensor, or from measurements acquired by multiple displacement sensors 200 to identify and/or discard determined dynamic vehicle characteristic values which are considered outliers, which fall outside of an acceptable tolerance, or which are based on an insufficient number of underlying measurements to reach a predetermined level of confidence.

An individual laser displacement sensor 200 generally consists of an imaging sensor 202 having a field of view FOV to receive reflected light from a surface illuminated by at least one associated laser emitter 204 or other associated light source. Preferably, a set of two or more laser emitters 204 are aligned in a vertically spaced arrangement on a support stand 206 together in a fixed relationship with the imaging sensor 202. In one embodiment, illustrated in FIG. 2, a total of four vertically spaced laser emitters 204 are associated with a single imaging sensor 202. Greater or smaller numbers of laser emitters 204 may be employed without departing from the scope of the present disclosure, depending upon the amount of displacement measurement data to be collected for processing and averaging. The known or determinable vertical spacing between each laser emitter 204 may be uniform, varied, or symmetric. Each laser emitter 204 is configured to project a laser beam 208, preferably parallel to the ground G or vehicle support surface, onto surfaces of the vehicle V passing through the field of view FOV of the associated imaging sensor 202, such that reflected laser light 210 from the surfaces is received on a pixel array of the associated imaging sensor 202 after passing through an appropriate focusing lens or optical system.

Figure 3:
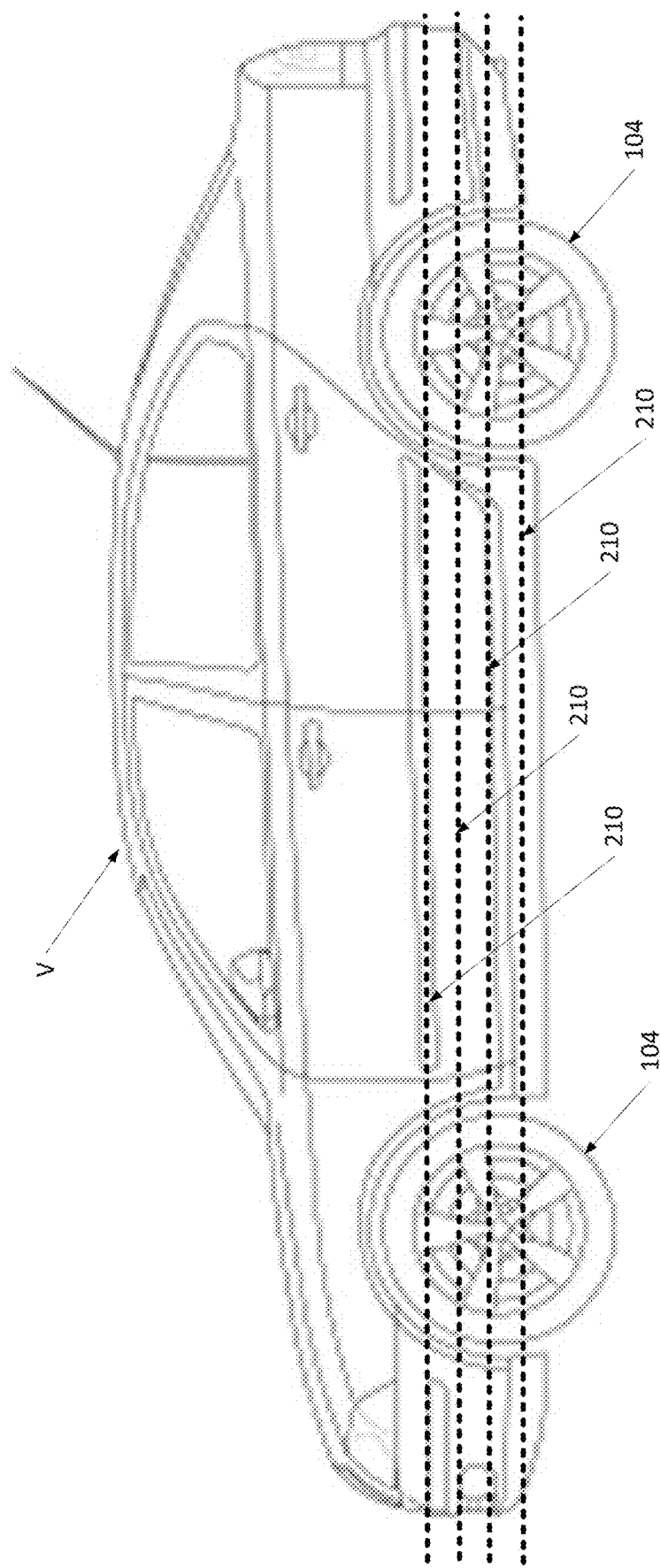
FIG. 3 is a side plan view of a vehicle V, illustrating the contours of reflected laser light as the vehicle V moves past a single displacement sensor of FIG. 2.

Those of ordinary skill in the art will recognize that additional laser emitters 204 may be utilized to project a plurality of parallel laser beams (for example, defining a grid of illuminated points on the surface of an observed object) which are subsequently reflected onto the pixel array of the associated imaging sensor 202 without departing from the scope of the present disclosure. As a vehicle moves past the individual laser displacement sensor 200 each laser beam 208 will intersect the moving vehicle surfaces at a different vertical elevation, such that the reflected laser light 210 from each beam is tracked along an associated horizontal contour on the side surfaces of the vehicle V by the vehicle movement, as seen in FIG. 3.

The distribution and characteristics of the reflected laser light 210 received at the pixel array corresponds at least partially with the characteristics of the surface from which the laser beams 208 are reflected. The spatial location of the pixels (individual light sensing elements) in the pixel array which receive the reflected light are used to determine the precise displacement of the point from which the laser beams 208 were reflected, relative to the light sensing pixel array, preferably to a sub-pixel resolution. As the displacement of the observed surface changes relative to the stationary pixel array due to movement of the vehicle V, corresponding changes occur in the incident location of the reflected laser light 210 on the light sensing pixel array. Through image processing, distribution and characteristics of the observed reflected laser light 210 may be used, together with known parameters of the displacement sensor 200, to triangulate at discrete points in time, the relative spatial location of the point of reflection on a surface of the moving vehicle V within the field of view FOV and sensing region 50. For example, the reflected laser light 210 from a set of laser beams 208 in an individual displacement sensor 200 are observed by the imaging sensor 202 as they cross the surfaces of a vehicle wheel assembly, generating a set of associated displacement measurements identified as Lasers 0-3, with Laser 0 producing the vertically lowest contour trace in FIG. 3, and Laser 3 producing the vertically highest contour trace across the vehicle surfaces.

In an embodiment of the present disclosure illustrated in FIG. 1, one sensor unit 150L, 150R is disposed on each side of a sensing region 50 of an inspection lane 10 through which a vehicle V passes. Each sensor unit 150L, 150R is configured with a set of four laterally spaced displacement sensors 200, each having a set of laser emitters 204 configured to project laser beams 208 in an associated vertical plane containing a corresponding measurement axis. Each displacement sensor 200 is configured to observe reflected light from multiple vertically spaced laser beams 208, shown in an exemplary configuration with sets of four, such that a total of sixteen discrete measurement points are potentially available on each side surface of a moving vehicle V passing through the sensing region 50. Those of ordinary skill in the art will recognize that changes in the number of displacement sensors 200, or the number of laser beams 208 associated with each individual displacement sensor 200, will provide a corresponding increase (or decrease) in the number of potentially available measurement points from which data can be collected by the associated imaging sensors 202. At a minimum, a single displacement sensor 200 including a single laser beam 208 may be disposed as the "array" within the sensor units 150L, 150R on each side of the sensing region 50 of the inspection lane 10.

By using multiple displacement sensors 200, each having multiple laser emitters 204, a greater number of displacement measurements can be acquired from a passing vehicle V, enabling the system 100 to determine useful representations of dynamic vehicle characteristics even if several of the acquired displacement measurements are discarded as outliers or otherwise unreliable data. Correspondingly, by using multiple measurements of the same surfaces of the moving vehicle V, multiple representations of a dynamic vehicle characteristic can be determined and evaluated to discard outlier results or otherwise questionable values using tolerance ranges or comparisons with the values determined by adjacent displacement sensors 200. The number of measurement values or determined representations of a dynamic vehicle characteristic discarded as outliers can be used to establish a confidence score or factor to be associated with the remaining measurement values or determined representations. If a sufficient number of measurement values or determined representations are discarded, the remaining data may be treated as suspect or discarded entirely.

Figure 2:
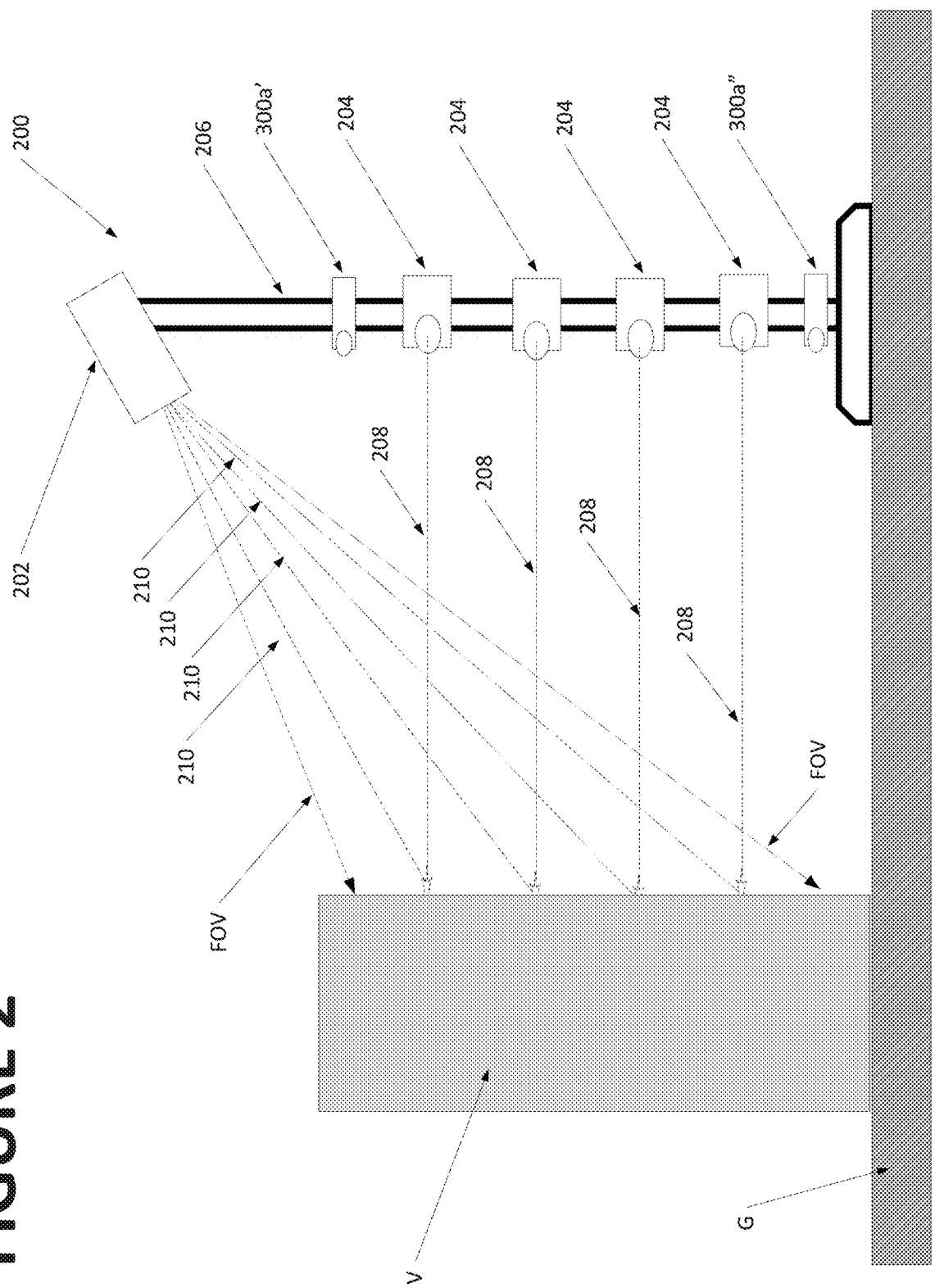
FIG. 2 is a side view of a single displacement sensor within a sensor unit of FIG. 1.

During operation as a vehicle V moves through the sensing region 50, the laser beams 208 from the individual displacement sensors 200 project points of light onto the various surfaces of the moving vehicle V as the vehicle traverses past the stationary displacement sensors 200. Movement of the vehicle V causes the incident points of the stationary laser beams 208 to traverse contours across the various vehicle surfaces. Positional changes of the reflected laser light 210 received at the light-sensing pixel arrays of each displacement sensor 200 are analyzed by a controller or processor to provide displacement measurement values associated with the distance between the individual points of reflection from the vehicle surfaces and the displacement sensor 200, generating a set of data points defining contour plots representative of the surfaces of the vehicle V along the measurement axis of each of the laser emitters 204, defined by the individual laser beams 208, such as shown in FIG. 2.

Observed changes in laser spot intensity or laser spot size in the light-sensing pixel array may optionally be analyzed to identify characteristics of the reflecting surface, such as material type, reflectivity, or transparency. The established relationship of the parallel laser beams 208 to each other, i.e., horizontally displaced, vertically displaced, or both horizontally and vertically displaced relative to a reference plane, such as the ground G or vehicle support surface, compared with the observed positions of the reflected laser light 210 on the light-sensing pixel array provide additional information about the illuminated surfaces. This additional information may include, but is not limited to, an angular orientation between the observed surface and the ground G, or the motion of the observed surface relative to the ground G.

Each displacement sensor 200 within a sensor unit 150 acquires displacement measurements associated with an observed set of spaced illuminated points or locations on the side surfaces of the moving vehicle V. A collection of displacement measurements from multiple points or locations on the side surfaces of the moving vehicle V is evaluated using a variety of techniques to obtain average measurements, to discard outlier measurements which exceed a selected tolerance or which show other statistical deviations, and optionally to detect, identify, or compensate for characteristics of vehicle movement which might influence the measurements. Such characteristics of vehicle movement may include, but are not limited to, changes in vehicle velocity (braking or accelerating), oscillations in the vehicle suspension (such as from driving over elevation changes in an inspection lane floor surface), changes in vehicle tires (tire sidewall deformation or flexing), and steering changes as the moving vehicle V passes through the sensing region 50 in the vehicle inspection lane 10.

Additional factors which may influence acquired measurements include, but are not limited to, wheel assembly runout, tire sidewall raised letter or features, and tire sidewall non-uniformity. For example, the presence of a driver in the moving vehicle V introduces a tilt or bias in the vehicle suspension system, causing the moving vehicle to lean to dip slightly towards the driver's side, due to an uneven lateral distribution of weight. When a static vehicle is measured using a precision vehicle wheel alignment measurement system, typically in a stationary position on a precision level alignment rack, the driver is absent from the vehicle, resulting in ideal weight distribution and measurement conditions. Accordingly, the presence of the driver in the moving vehicle V during non-contact measurement or inspection can be accounted for by establishing an "average driver" correction factor to apply to vehicle wheel alignment values determined from displacement measurements acquired while the vehicle V is in motion through the inspection lane 10. Different correction factors may be applied to the determined vehicle characteristic values associated with different vehicle wheel alignment angles, depending upon how strongly the particular vehicle wheel alignment angle is influenced by the presence of the driver or other vehicle-motion induced effects. Similarly, other correction factors may be utilized for different types of vehicles, based on the stiffness or style of the moving vehicle's suspension system.

A method of the present disclosure for applying compensation, offset or correction factors to measurements acquired by a vehicle inspection system having first and second displacement sensor assemblies disposed on opposite longitudinal sides of a vehicle inspection lane through which the moving vehicle passes is described in connection with the flow chart shown in FIG. 4. A moving vehicle undergoing inspection passes through the inspection lane in a generally longitudinal direction (300). Displacement measurements associated with at least the wheel assemblies on a first lateral side of the moving vehicle are acquired (302) by the first displacement sensor assembly, while displacement measurements associated with the wheel assemblies on a second lateral side of the moving vehicle are acquired (304) by the second displacement sensor assembly. A processing system receives displacement measurement data from both the first and second displacement sensor assemblies. The processing system further configured with software instructions to: (a) evaluate the received displacement measurement data to determine at least one dynamic vehicle characteristic (306); (b) apply at least one compensation factor (308a) to at least one determined dynamic vehicle characteristic to adjust for dynamic vehicle effects (308); and (c) compare at least one compensated dynamic vehicle characteristic with a static vehicle specification value (310) for producing an output report (312a), a display to a user (312b), and/or an entry into a data storage system (312c).

Dynamic vehicle characteristics determined by the processing system from the displacement measurements correspond to one or more alignment angles associated with a stationary vehicle, such as individual wheel toe angles, individual wheel camber angles, or axle total toe angles. However, vehicle characteristics determined from displacement measurements made on a moving vehicle (i.e., dynamic vehicle characteristics) may not have the same values as the same vehicle characteristics determined from measurements made on a stationary vehicle (i.e., static vehicle characteristics). Accordingly, the processing system is configured with software instruction to apply one or more correction, offset, or compensation factors to the dynamic vehicle characteristics (or vice versa), enabling a meaningful comparison between dynamic vehicle characteristics and specification values for static vehicle characteristics.

Correction, offset, or compensation factors may vary depending on a variety of factors. Exemplary basis for factors may include, but are not limited to, which axle of the vehicle the dynamic vehicle characteristics are determined for (i.e., front axle or rear axle), vehicle suspension geometry, a style of the vehicle (i.e., compact vehicle, sports vehicle, luxury vehicle, light truck, or sport utility vehicle), variations associated with a dimension of at least one tire and/or wheel installed on the moving vehicle (i.e., tire and/or rim size), measured tire inflation pressures, vehicle ride height, and vehicle speed. The specific correction, offset, or compensation factor may be as simple as a fixed corrective value that is either added or subtracted to the determined vehicle characteristic, or may be calculated using a predetermined formula responsive to one or more variables associated with the vehicle, such as vehicle speed or driver weight.

Selection (and determination) of correction, offset, or compensation factors applied by the processing system to the determined dynamic vehicle characteristics may be predetermined by default settings in the software instructions, selected automatically by the processing system in response to one or more variables, or based on input received from an operator. For example, the vehicle inspection system may be further configured with an imaging sensor to acquire one or more images of the moving vehicle, from which the processing system can extract vehicle identifying features such as a vehicle body style or alpha-numeric license plate data. By cross-referencing the identifying features with a vehicle feature database accessible to the processing system, such as through the use of a license-plate to VIN conversion procedure, properties of the vehicle can be identified by the processing system, from which specific correction, offset, or compensation factors or formulas noted previously can be recalled from a data storage system or computed as needed.

Once the correction, offset, or compensation factors are selected, they are applied by the processing system to the dynamic vehicle characteristics determined for the moving vehicle. The resulting values for the corrected, offset, or compensated dynamic vehicle characteristics can then be evaluated in a comparison with specification values for corresponding static vehicle characteristics and subsequently output for display to an operator, included in a generated report, or entered into a vehicle service record database.

An exemplary vehicle inspection method of the present disclosure involves moving a vehicle in a generally longitudinal direction through a vehicle inspection lane (300), during which time a plurality of displacement measurements to surfaces on the first longitudinal side (302) and second longitudinal side (304) of the vehicle are acquired. The acquired measurements include displacement measurements associated with surfaces of the rolling wheel assemblies on each side of the vehicle, which are evaluated (306) to determine at least one dynamic characteristic of the vehicle in motion. The dynamic vehicle characteristic may be a representation of wheel toe angle, wheel camber angle, or axle total toe. To facilitate a comparison of the determined dynamic vehicle characteristic with a similar characteristic of the vehicle in a static condition, one or more compensation factors, offsets, or corrections (308*a*) are applied (308) to the determined dynamic vehicle characteristic values to account for the effects of vehicle motion and/or driver presence. The resulting compensated dynamic vehicle characteristic values are then compared (310) with a static vehicle specification values for output to a report (312*a*), user display (312*b*), or placement in a vehicle service record data storage system (312*c*).

The correction, offset, or compensation factors may be predetermined, selected automatically in response to one or more variables, calculated from predetermined formulas, or established based on input received from an operator. For example, acquired images of the moving vehicle can be evaluated to determine vehicle identifying features such as a vehicle body style or alpha-numeric license plate data. By cross-referencing the identifying features with an accessible vehicle feature database, such as through the use of a license-plate to VIN conversion procedure, properties of the vehicle can be identified, from which specific correction, offset, or compensation factors noted previously can be recalled from a data storage system.

Once the correction, offset, or compensation factors are selected or computed, they are applied to the dynamic vehicle characteristics determined for the moving vehicle. The resulting values for the corrected, offset, or compensated dynamic vehicle characteristics are subsequently evaluated in association with specification values for corresponding static vehicle characteristics and then subsequently output for display to an operator, included in a generated report, or entered into a vehicle service record database.

While the present disclosure has described a vehicle measurement or inspection system in which an output is conveyed to an operator through a suitably configured operator console (60), it will be understood that output may optionally be provided to the operator in the form of a printed report, stored in a machine-readable database, or communicated over a network to a remote vehicle service system or software application. The processing system used with the vehicle measurement or inspection system of the present disclosure may be in the form of a dedicated computer system associated with a specific set of sensors forming a vehicle measurement or inspection system, or may be in the form of a server system configured to communicate with a variety of sensors forming two or more independent vehicle measurement or inspection systems. Communications between the various sensors and the processing system may be via any conventional data transmission means, such as wired networks, wireless networks, or any combination thereof.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A vehicle inspection system, comprising:
a first displacement sensor assembly disposed on one longitudinal side of a vehicle inspection lane through which a vehicle undergoing inspection moves in a longitudinal direction, said first displacement sensor assembly oriented to acquire displacement measurements associated with at least one wheel assembly on a first lateral side of the moving vehicle;
a second displacement sensor assembly disposed on an opposite longitudinal side of said vehicle inspection lane, said second displacement sensor assembly oriented to acquire displacement measurements associated with at least one wheel assembly on a second lateral side of the moving vehicle;
a processing system configured to receive displacement measurement data from said first and second displacement sensor assemblies, said processing system further configured with software instructions to
a) evaluate said received displacement measurement data to determine a value for at least one dynamic vehicle characteristic, wherein said dynamic vehicle characteristic is affected by at least one of (i) the vehicle's speed, and (ii) a presence of a driver within said vehicle;
b) apply at least one compensation factor, offset, correction value, or formula to said determined value of said at least one dynamic vehicle characteristic to adjust said determined value for an effect of said vehicle's speed and/or a driver presence within said vehicle; and
c) compare said at least one adjusted value with a specification value for said characteristic on a static vehicle at rest to produce an output to a user, report, or data storage system.

2. The vehicle inspection system of claim 1 wherein said at least one determined value is representative of one of a wheel toe angle, a wheel camber angle, or an axle total toe for said moving vehicle; and
wherein said specification value is an associated wheel toe angle specification, an associated wheel camber angle specification, or an associated axle total toe specification.

3. The vehicle inspection system of claim 1 wherein said processing system is configured with software instructions to apply a first compensation factor, offset, correction value, or formula to a first determined value which is associated with a first axle of the moving vehicle; and
wherein said processing system is configured with software instructions to apply a second compensation factor, offset, correction value, or formula to a second determined value which is associated with a second axle of the moving vehicle.

4. The vehicle inspection system of claim 1 wherein said at least one compensation factor, offset, correction value, or formula is selected in response to a style of said vehicle, wherein said vehicle style is a compact vehicle, a sports vehicle, a luxury vehicle, a light truck, or a sport utility vehicle.

5. The vehicle inspection system of claim 1 further including at least one imaging sensor configured to acquire at least one image of an identifying feature on said moving vehicle;
wherein said processing system is further configured with software instructions to evaluate said at least one acquired image of said identifying feature to extract vehicle identifying data; and
wherein said processing system is further configured with software instructions to utilize said extracted vehicle identifying data to select said at least one compensation factor, offset, correction value, or formula.

6. The vehicle inspection system of claim 1 wherein said at least one compensation factor, offset, correction value, or formula is further selected to compensate said at least one determined value for an effect associated with at least one tire and/or wheel installed on said moving vehicle.

7. The vehicle inspection system of claim 1 further including a drive-over tire pressure measurement system configured to acquire at least one measure of inflation pressure for a wheel assembly of the moving vehicle; and
wherein said at least one compensation factor, offset, correction value, or formula is selected to compensate said at least one determined value for a dynamic vehicle effect which is further associated with said measured wheel assembly inflation pressure.

8. The vehicle inspection system of claim 1 wherein said at least one compensation factor, offset, correction value, or formula is further selected to compensate said at least one determined value for an identified ride-height of said moving vehicle.

9. A vehicle inspection method, comprising:
moving a vehicle through a vehicle inspection lane once;
acquiring, during said movement through said inspection lane, a plurality of displacement measurements to surfaces on a first side of said vehicle from a first displacement sensor assembly disposed on one longitudinal side of a vehicle inspection lane and to surfaces on an opposite side of said vehicle from a second displacement sensor assembly disposed on an opposite longitudinal side of said vehicle inspection lane, said plurality of displacement measurements including displacement measurements acquired from surfaces of rolling wheel assemblies on each side of said vehicle;
evaluating said acquired displacement measurements to determine a value representative of at least one vehicle characteristic;
compensating said at least one determined value to adjust for a change in said vehicle characteristic associated with said movement of said vehicle; and
comparing each compensated value with a specification value for said characteristic of a stationary vehicle for output to a user, report, or data storage system.

10. The vehicle inspection system of claim 9 wherein said at least one determined value is representative of one of a wheel toe angle, a wheel camber angle, or an axle total toe for said moving vehicle; and
wherein said stationary vehicle specification value is an associated wheel toe angle specification, an associated wheel camber angle specification, or an associated axle total toe specification, for said vehicle at rest.

11. The vehicle inspection method of claim 9 wherein said step of compensating further includes compensating a first determined value associated with a first axle of the moving vehicle to adjust for said change associated with said vehicle movement; and compensating a second determined value which is associated with a second axle of the moving vehicle to adjust for said change associated with said vehicle movement.

12. The vehicle inspection method of claim 9 further including the step of selecting at least one compensation factor, offset, correction value, or formula for use in compensating said at least one determined value based on a style of said vehicle, said style selected from a set of vehicle styles including a compact vehicle, a sports vehicle, a luxury vehicle, a light truck, and a sport utility vehicle.

13. The vehicle inspection method of claim 9 further including the steps of acquiring at least one image of an identifying feature on said moving vehicle;

evaluating said at least one acquired image of said identifying feature to extract vehicle identifying data; and selecting, based on said extracted vehicle identifying data, at least one compensation factor, offset, correction value, or formula for use in said compensating step.

14. The vehicle inspection method of claim 9 further including the step of selecting at least one compensation factor, offset, correction value, or formula for use in said compensating step to compensate said at least one determined value based on a dimension of at least one tire and/or wheel installed on said moving vehicle.

15. The vehicle inspection method of claim 9 further including the steps of acquiring at least one measure of inflation pressure for a wheel assembly of the moving vehicle; and selecting at least one compensation factor, offset, correction value, or formula for use in said compensating step to compensate said at least one determined value based on said measured wheel assembly inflation pressure.

16. The vehicle inspection method of claim 9 further including the step of selecting, for use in said compensation step, at least one compensation factor, offset, correction value, or formula to compensate said at least one determined value based on an identified ride-height of said moving vehicle.

17. The vehicle inspection method of claim 9 wherein at least one compensation factor, offset, correction value, or formula for use in said compensation step is recalled from a data storage system in response to an identified property of said moving vehicle.

* * * * *